United States Patent
Kushiyama

(10) Patent No.: US 7,526,049 B2
(45) Date of Patent: Apr. 28, 2009

(54) DATA SAMPLING CIRCUIT AND SEMICONDUCTOR INTEGRATED CIRCUIT

(75) Inventor: Natsuki Kushiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 11/443,184

(22) Filed: May 31, 2006

(65) Prior Publication Data

US 2007/0009073 A1    Jan. 11, 2007

(30) Foreign Application Priority Data

May 31, 2005    (JP) .............................. 2005-160077

(51) Int. Cl.
*H03D 3/24*    (2006.01)

(52) U.S. Cl. .................... 375/326; 375/373; 375/376

(58) Field of Classification Search ................ 375/326, 375/327, 354, 355, 373, 375, 376
See application file for complete search history.

(56) References Cited

U.S. PATENT DOCUMENTS 6,125,157 A * 9/2000 Donnelly et al. ............ 375/371
7,170,962 B2 * 1/2007 Joy et al. .................... 375/371
2003/0123589 A1 * 7/2003 Glenn et al. ................. 375/354
2004/0114632 A1    6/2004 Yuuki et al.

* cited by examiner

*Primary Examiner*—Chieh M Fan
*Assistant Examiner*—Jaison Joseph
(74) *Attorney, Agent, or Firm*—Oblon, Spivak, McClelland, Maier & Neustadt, P.C.

(57) ABSTRACT

A data sampling circuit has a receiver which receives an embedded clock obtained by multiplexing a clock signal and data, a phase comparator which outputs a phase difference signal by performing a phase comparison between the embedded clock and a first reference clock signal, a phase interpolator which adjusts a phase of the first reference clock signal and generates a second reference clock signal having a phase different from the phase of the first reference clock signal by 90°, based on the phase difference signal, a feedback controller which conforms the phase of the first reference clock signal with the phase of the embedded clock by feedback control using the phase comparator and the phase interpolator, a sampling controller which performs phase interpolation of the second reference clock signal at higher speed than the feedback control of the first feedback loop based on the phase difference signal, and a sampling circuit which samples the embedded clock received by the receiver in synchronization with the second reference clock signal obtained by phase interpolation of the sampling controller.

20 Claims, 5 Drawing Sheets

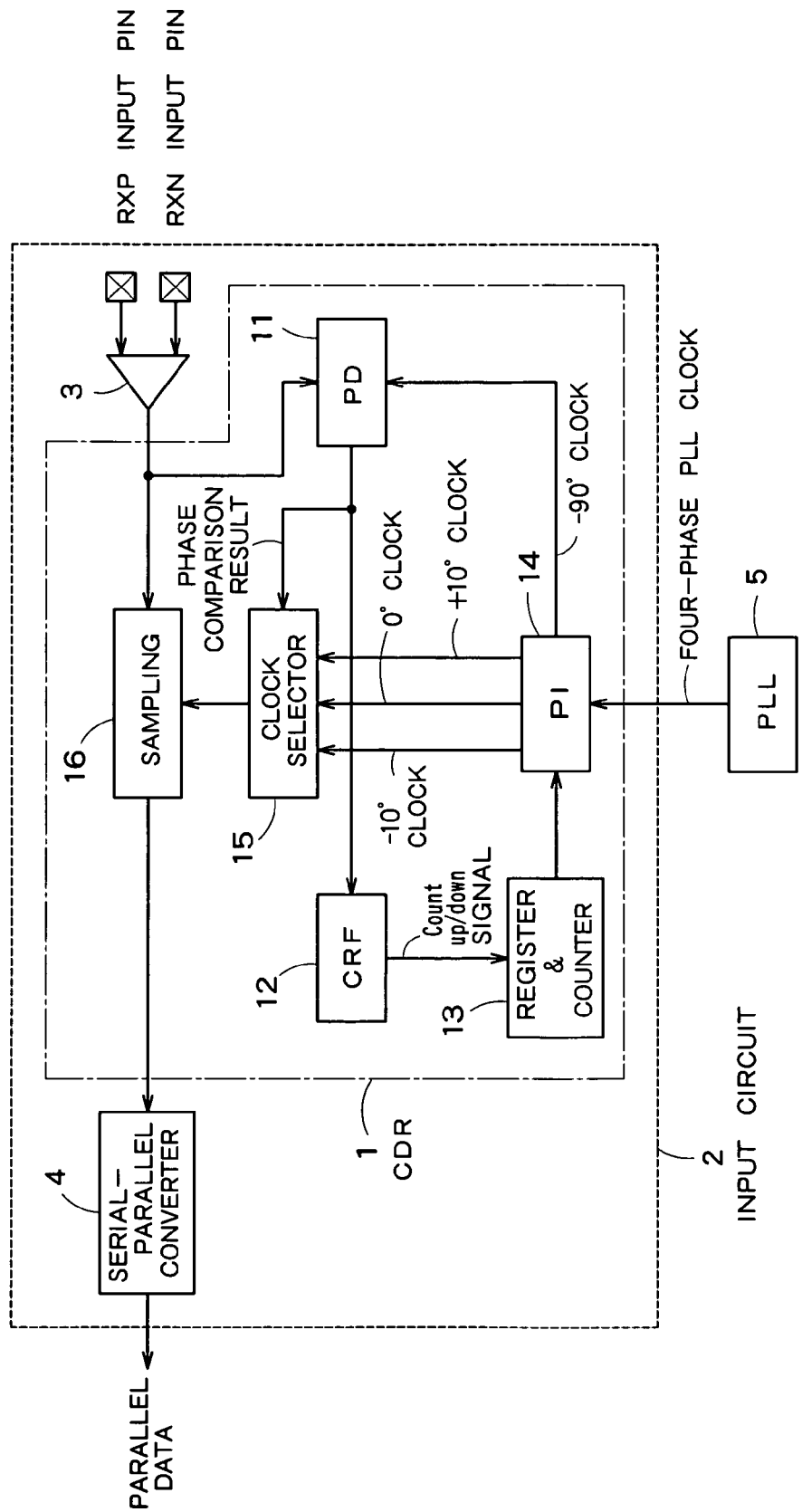
F I G. 1

US 7,526,049 B2

DATA SAMPLING CIRCUIT AND SEMICONDUCTOR INTEGRATED CIRCUIT

CROSS REFERENCE TO RELATED APPLICATIONS

This application is based upon and claims the benefit of priority from the prior Japanese Patent Application No. 2005-160077, filed on May 31, 2005, the entire contents of which are incorporated herein by reference.

BACKGROUND OF THE INVENTION

1. Field of the Invention

The present invention relates to a data sampling circuit and a semiconductor integrated circuit which receive an embedded clock obtained by multiplexing a clock signal and data on each other to sample it.

2. Related Art

In recent years, a certain data transmission and reception method is prevalent in a high-speed serial I/Fs (SerDes) field. In the method, a transmitting (TX) side transmits an embedded clock obtained by embedding a clock in data, and a receiving (RX) side extracts edge information of the embedded clock from a received signal, samples the data on an extracted clock edge, and restores it. A circuit which performs extraction of clock edges of an embedded clock and data sampling is called a CDR (Clock and Data Recover) circuit (see Japanese Patent Laid-Open Publication No. 357729/1992).

To restore a clock from a received signal on a receiving side, there are two available methods, one is a method of equipping a PLL in each channel and restoring both the frequency and phase of the clock, and the other is a method of equipping a phase interpolator (PI) in each channel and restoring only the phase of the clock. The latter method is commonly used.

In the latter method, all channels have only one PLL in common. The PLL supplies multiphase clocks to the PI of each channel. The PI and a phase detector form a feedback loop and generate a clock for sampling data in an embedded clock.

However, in a conventional CDR circuit, a feedback loop as described above responds slowly. If high-frequency jitter is multiplexed on an embedded clock or a phase shift suddenly occurs, the feedback loop may be unable to cope with such a change and fail to correctly take in data.

SUMMARY OF THE INVENTION

According to one embodiment of the present invention, a data sampling circuit, comprising:

a receiver which receives an embedded clock obtained by multiplexing a clock signal and data;

a phase comparator which outputs a phase difference signal indicating phase comparison result by performing a phase comparison between the embedded clock and a first reference clock signal;

a phase interpolator which adjusts a phase of the first reference clock signal and generates a second reference clock signal having a phase different from the phase of the first reference clock signal by 90°, based on the phase difference signal;

a feedback controller which conforms the phase of the first reference clock signal with the phase of the embedded clock by feedback control using the phase comparator and the phase interpolator;

a sampling controller which performs phase interpolation of the second reference clock signal at higher speed than the feedback control of the first feedback loop based on the phase difference signal; and a sampling circuit which samples the embedded clock received by the receiver in synchronization with the second reference clock signal obtained by phase interpolation of the sampling controller.

According to one embodiment of the present invention, a semiconductor integrated circuit, comprising:

a PLL circuit which generates four kinds of reference signals having phases different from each other;

a data sampling circuit which samples an embedded clock obtained by multiplexing a clock signal and data by using the four kinds of reference signals; and a serial-parallel converter which converts the embedded clock sampled by the data sampling circuit into parallel data, wherein the data sampling circuit includes:

a receiver which receives the embedded clock;

a phase comparator which outputs a phase difference signal by performing a phase comparison between the embedded clock and a first reference clock signal generated based on the four kinds of reference signals;

a phase interpolator which adjusts a phase of the first reference clock signal and generates a second reference clock signal having a phase different from the phase of the first reference clock signal by 90°, based on the phase difference signal;

a feedback controller which conforms the phase of the first reference clock signal with the phase of the embedded clock by feedback control using the phase comparator and the phase interpolator;

a sampling controller which performs phase interpolation of the second reference clock signal at higher speed than the feedback control of the first feedback loop based on the phase difference signal; and a sampling circuit which samples the embedded clock received by the receiver in synchronization with the second reference clock signal obtained by phase interpolation of the sampling controller.

BRIEF DESCRIPTION OF THE DRAWINGS

FIG. 1 is a block diagram showing the schematic configuration of a data sampling circuit according to a first embodiment of the present invention;

DETAILED DESCRIPTION OF THE INVENTION

Figure 2:
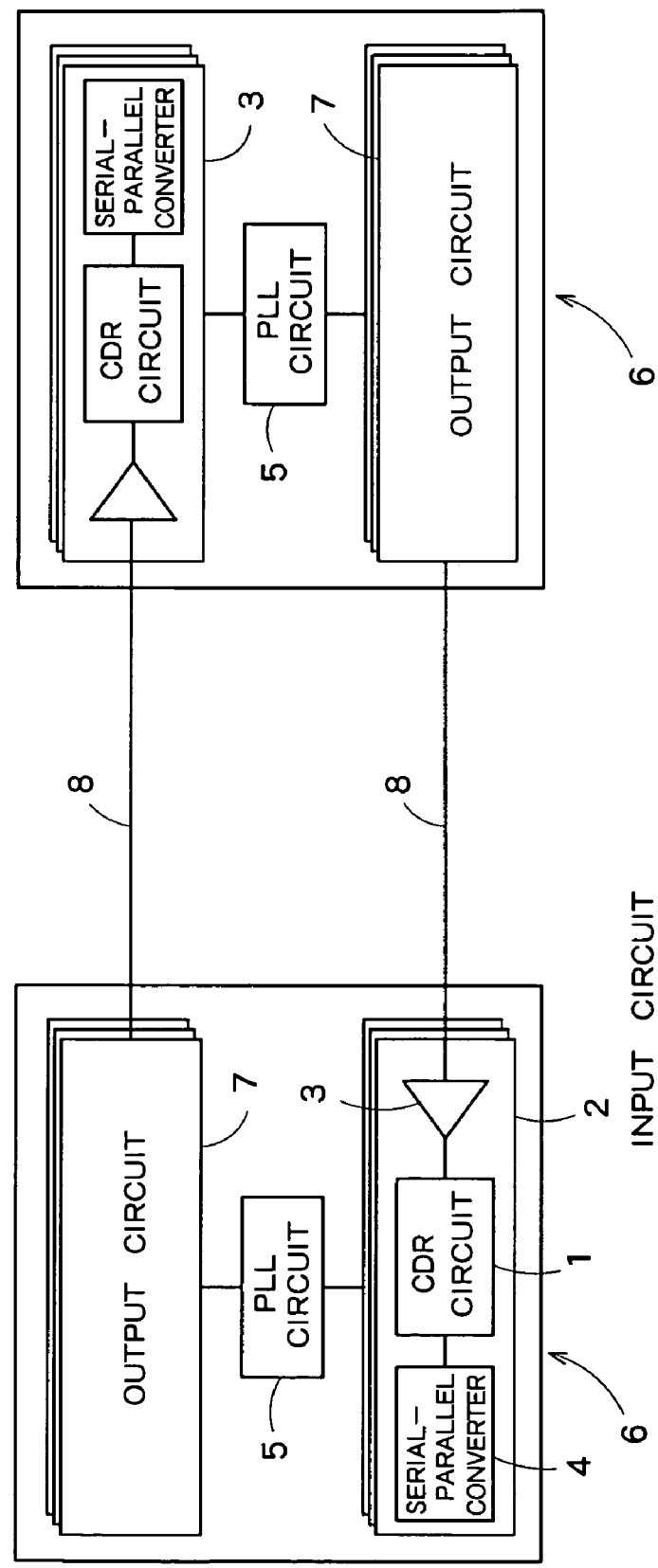
FIG. 2 is a block diagram showing one example of the schematic arrangement of a PHY 6.

Embodiments of the present invention will be explained below with reference to the drawings.

First Embodiment

FIG. 1 is a block diagram showing a schematic configuration of a data sampling circuit according to a first embodiment of the present invention. The data sampling circuit of FIG. 1 is also called a CDR (Clock and Data Recover) circuit 1 and provided inside an input circuit 2. The input circuit 2 includes a receiver 3 which receives an embedded clock obtained by multiplexing a clock signal and data on each other, the CDR circuit 1, which samples the data having the embedded clock multiplexed thereon, and a serial-parallel converter 4 which converts the sampled data into parallel data.

The input circuit 2 is provided for each reception channel. That is, if there are a plurality of reception channels, a plurality of input circuits 2 are provided. The input circuits 2 share one PLL (Phase Locked Loop) circuit 5 which generates four-phase reference signals having phases different from each other by 90°.

The plurality of input circuits 2 mentioned above and PLL circuit 5 are incorporated in a chip called a PHY 6. The name "PHY 6" is derived from data communication at the physical layer.

FIG. 2 is a block diagram showing one example of schematic configuration of the PHY 6. As shown in FIG. 2, the PHY 6 is provided for each of two communication devices which communicate with each other. Each PHY 6 includes the input circuit 2 shown in FIG. 1 and an output circuit 7 which transmits an embedded clock. The input circuit 2 and output circuit 7 are provided for each of transmission channels. The input circuits 2 and output circuits 7 share the one PLL circuit 5.

The output circuits 7 operate in a way reverse to that of the input circuits 2. Each output circuit 7 converts parallel data supplied from a host processor (not shown) into serial data, multiplexes a clock with the data to generate an embedded clock, and transmits the embedded clock through a driver.

The PHYs 6, which communicate data with each other, can transmit an embedded clock as described above at high speed through serial transmission lines 8 provided for each channel.

The configuration and operation of each CDR circuit 1 will be explained in detail with reference to FIG. 1. The CDR circuit 1 of FIG. 1 has a phase detector 11, a CRF (Clock Recovery Filter) circuit 12, a register & counter 13, a phase interpolator (PI) 14, a clock selector 15, and a sampling circuit 16.

The phase interpolator 14 receives, from the PLL circuit 5, four-phase reference signals having phases different from each other by 90° and generates a reference clock signal having an arbitrary phase by adjusting a ratio of mixing the reference signals having phases different from each other by 90°. The mixing ratio is determined from a register value held by the register & counter 13. The phase interpolator 14 outputs two reference clock signals having phases different from each other by 90° (a 0° clock signal and a −90° clock signal) on the basis of the four-phase reference signals supplied from the PLL circuit 5. The phase interpolator 14 also generates a 10° clock signal which is 10° ahead of the 0° clock signal in phase and a −10° clock signal which is 10° behind the 0° clock signal in phase. The 0° clock signal and ±10° clock signals are supplied to the clock selector 15, and the −90° clock signal is supplied to the phase detector 11.

In this embodiment, the larger the register value held in the register & counter 13 is, the later the phases of the 0° clock and the −90° clock get.

The receiver 3 receives and amplifies small-amplitude differential signals RXP and RXN serving as an embedded clock. An output from the receiver 3 is supplied to the phase detector 11 and sampling circuit 16. The phase detector 11 compares timing (phase) when the embedded clock changes from "0" to "1" or when the embedded clock changes from "1" to "0" with the phase of the −90° clock signal. If the phase of the −90° clock signal is earlier, the phase detector 11 outputs an Early signal at "H" level indicating that the phase is earlier. On the other hand, if the phase of the −90° clock signal is later, the phase detector 11 outputs a Late signal at "H" level indicating that the phase is slow. If the phases are equal, the phase detector 11 sets the Early signal and Late signal to "L" level.

The outputs (Early signal and Late signal) from the phase detector 11 are supplied to the CRF circuit 12. The function of the CRF circuit 12 is to remove high-frequency components contained in the Early signal and Late signal. Generally, transition edges of the small-amplitude differential signals RXP and RXN contain jitter of high-frequency components which is derived from jitter components in the PLL circuit 5 on a transmitting side. For this reason, each of the Early signal and Late signal output from the phase detector 11 also contains jitter of high-frequency components. Such high-frequency components may oscillate a feedback loop constituted by the phase detector 11. The CRF circuit 12 is provided to remove the high-frequency components.

Examples of specific operation of the CRF circuit 12 include (1) and (2) below.

(1) Only if the Early signal or Late signal at "H" level is input to the CRF circuit 12 a plurality of times in series, the CRF circuit 12 outputs a Count up signal or Count down signal for indicating phase adjustment.

(2) The number of "H" level of the Early signal and the Late signal during a certain period of time are counted. If the number of times for the Early signal is larger, the CRF circuit 12 outputs a Count up signal giving an instruction to count up the register value of the register & counter 13. On the other hand, if the number of times for the Late signal is larger, the CRF circuit 12 outputs a Count down signal giving an instruction to count down the register value of the register & counter 13.

The register & counter 13 increments or decrements the register value on the basis of the Count up signal or Count down signal output from the CRF circuit 12. For example, it is assumed that the register value ranges from 1 to 256 and represents a 360° phase plane. If the register value is incremented only by one, each phase gets behind by 1.40625° (=360/256). If the CRF circuit 12 outputs a Count down signal at "H" level, the register & counter 13 decrements the register value only by one. The phase interpolator 14 makes the phases of the −90° clock signal and 0° clock signal one step ahead.

As described above, the phase detector 11, CRF circuit 12, register & counter 13, and phase interpolator 14 form a feedback loop. The phase interpolator 14 repeats phase adjustment for the 0° clock signal and −90° clock signal on the basis of the phase difference signals (Early signal and Late signal) detected by the phase detector 11.

The phase interpolator 14 outputs the 10° clock signal, which is 10° ahead of the 0° clock signal in phase, and the −10° clock signal, which is 10° behind the 0° clock signal in phase, in addition to the 0° clock signal and −90° clock signal. Note that the phase interpolator 14 need not necessarily output the ±10° clock signals and only needs to output two clock signals which are ahead of and behind the 0° clock signal serving as a reference in phase. For example, ±5° clock signals or ±20° clock signals may be output, instead of the ±10° clock signals.

Here, the −90° clock signal corresponds to a first reference clock signal, the 0° clock signal corresponds to a second reference clock signal, the +10° clock signal corresponds to a third reference clock signal and the −10° clock signal corresponds to a fourth reference clock signal.

The 0° clock signal and ±10° clock signals output from the phase interpolator 14 are supplied to the clock selector 15. The clock selector 15 selects one of the 0° clock signal and ±10° clock signals on the basis of the Early signal and Late signal supplied from the phase detector 11.

The phase detector 11 compares the phase of the embedded clock received by the receiver 3 with that of the −90° clock signal. If the phase of the −90° clock signal is ahead of the other, the phase detector 11 outputs the Early signal at "H" level and the Late signal at "L" level. If the phases of the signals are equal, the phase detector 11 outputs the Early signal at "L" level and the Late signal at "L" level. If the phase of the −90° clock signal is behind, the phase detector 11 outputs the Early signal at "L" level and the Late signal at "H" level.

The clock selector 15 selects the 10° clock signal if the Early signal is at "H" level, and the Late signal is at "L" level, selects the 0° clock signal if the Early signal is at "L" level, and the Late signal is at "L" level, and selects the −10° clock signal if the Early signal is at "L" level, and the Late signal is at "H" level.

The sampling circuit 16 samples the embedded clock in sync with a clock signal selected by the clock selector 15.

The clock selector 15 selects a clock signal on the basis of the Early signal and Late signal supplied from the phase detector 11, independently of the feedback loop constituted by the phase detector 11, CRF circuit 12, register & counter 13, and phase interpolator 14. Generally, the response speed of the feedback loop is not so high. Since the clock selector 15 directly selects a clock signal on the basis of the outputs from the phase detector 11, it can select a clock signal at a speed much higher than the response speed of the feedback loop.

As described above, the first embodiment switches between clock signals having phases different from each other by 10° depending on a phase difference detected by the phase detector 11. Accordingly, even if the response speed of the feedback loop constituted by the phase detector 11, CRF circuit 12, register & counter 13, and phase interpolator 14 is low, a phase most suitable for sampling the embedded clock can be determined at high speed, and the probability of failing to take in data can be reduced.

Second Embodiment

In a second embodiment, a sampling circuit 16 includes a plurality of sampling circuits.

Figure 3:
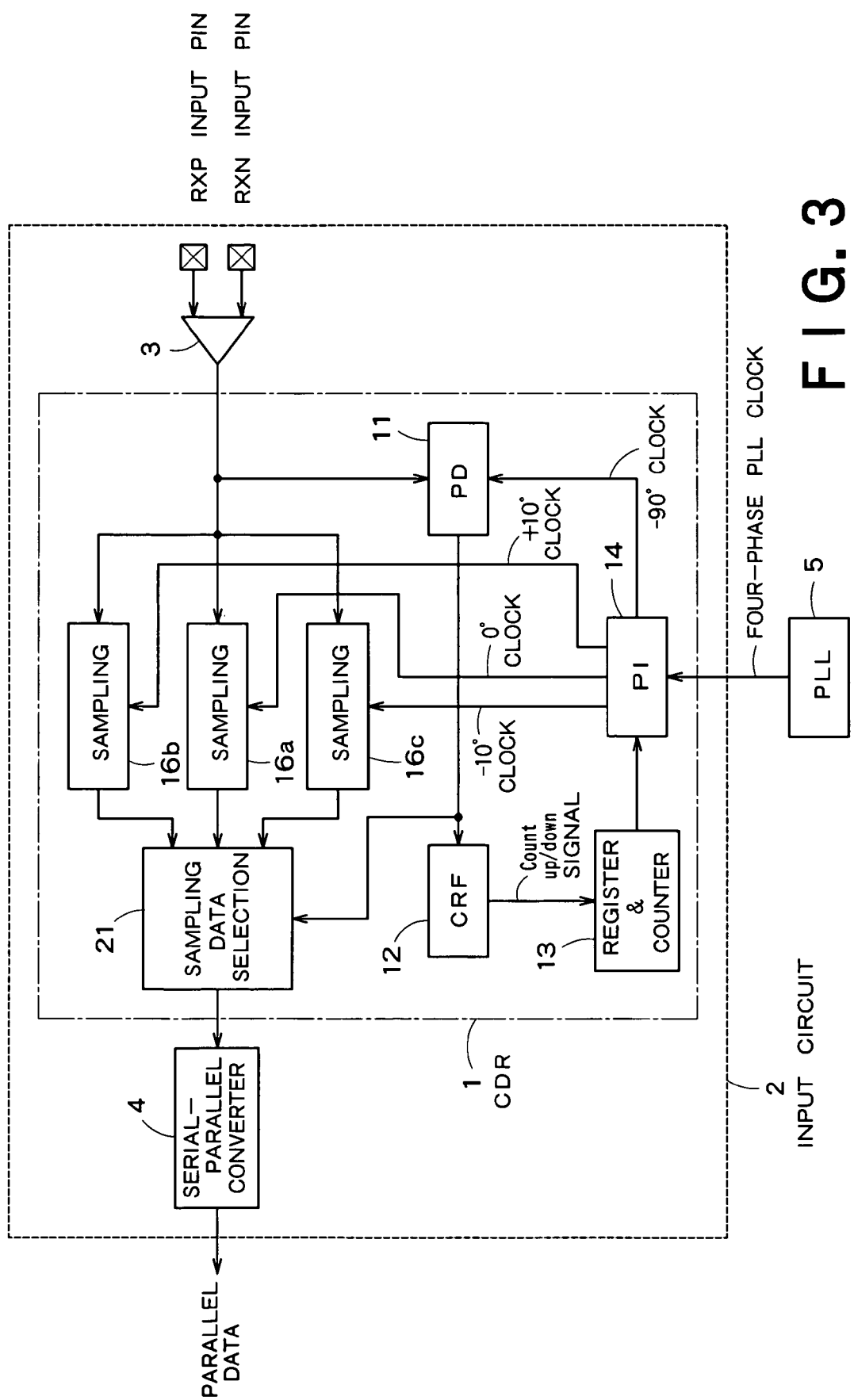
FIG. 3 is a block diagram showing the schematic configuration of a data sampling circuit 16 according to a second embodiment of the present invention.

FIG. 3 is a block diagram showing schematic configuration of the data sampling circuit 16 according to the second embodiment of the present invention. In FIG. 3, components common to those of FIG. 1 are denoted by the same reference numerals, and an explanation will be given below with a focus on differences.

The data sampling circuit 16 of FIG. 3 includes three sampling circuits 16a, 16b, and 16c which sample an embedded clock in sync with a 0° clock signal, a +10° clock signal, and a −10° clock signal, respectively, output from a phase interpolator 14 and a sampling data selection circuit 21 which selects one of sampled data obtained from the three sampling circuits 16a, 16b, and 16c, instead of the clock selector 15 and sampling circuit 16 of FIG. 1.

An embedded clock received by a receiver 3 is supplied to each of the three sampling circuits 16a, 16b, and 16c. Sampled data selected by the sampling data selection circuit 21 is converted into parallel data by a serial-parallel converter 4 within an input circuit 2.

As described above, in the second embodiment, the sampling circuit 16 performs sampling using the 0° clock signal and ±10° clock signals output from the phase interpolator 14 without change, and then, sampled data is selected. Accordingly, the sampling timing gets a little ahead of that of the first embodiment, and a failure to take in data becomes more unlikely to occur. Note that the number of sampling circuits required is larger by two than that of the first embodiment.

Third Embodiment

In a third embodiment, delay circuits are provided separately from a phase interpolator 14 to generate three clock signals for data sampling.

Figure 4:
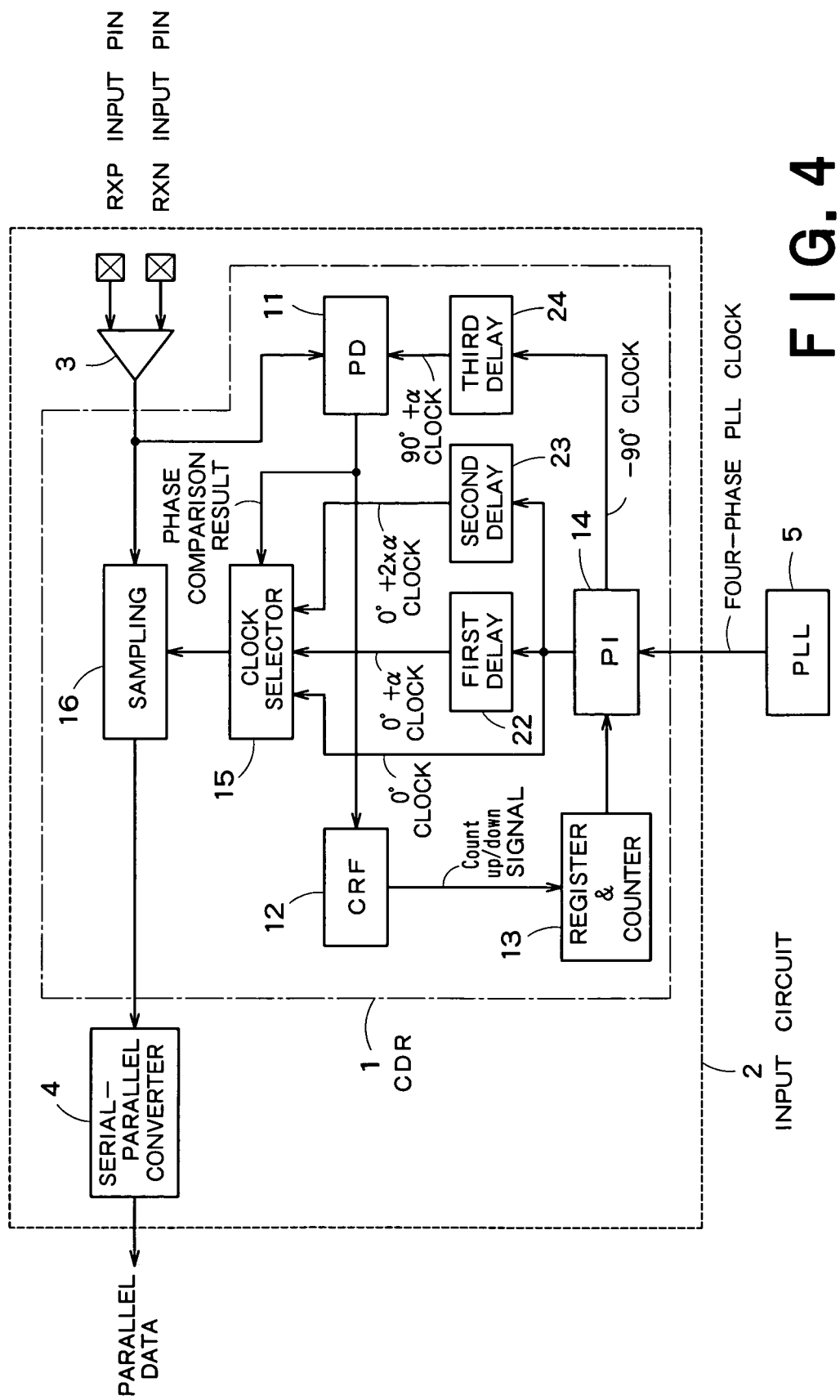
FIG. 4 is a block diagram showing the schematic configuration of a data sampling circuit 16 according to a third embodiment of the present invention.

FIG. 4 is a block diagram showing schematic configuration of a data sampling circuit 16 according to the third embodiment of the present invention. In FIG. 4, components common to those of FIG. 1 are denoted by the same reference numerals, and an explanation will be given below with a focus on differences.

The data sampling circuit 16 of FIG. 4 includes a phase interpolator 14 which outputs a 0° clock signal and a −90° clock signal, a first delay circuit 22 which generates a $(0+\alpha)°$ clock signal obtained by delaying the 0° clock signal by a phase of $\alpha$, a second delay circuit 23 which generates a $(0+2\alpha)°$ clock signal obtained by delaying the 0° clock signal by a phase of $2\alpha$, and a third delay circuit 24 which generates a $(-90+\alpha)°$ clock signal obtained by delaying the −90° clock signal by a phase of $\alpha$, instead of the phase interpolator 14 of FIG. 1.

In this embodiment, the phase interpolator 14 only needs to output two-phase clock signals. Accordingly, the internal configuration of the phase interpolator 14 can be made simpler than those of the first and second embodiments.

The second delay circuit 23 has a delay twice as long as that of the first delay circuit 22. The first and second embodiments use a 0° clock signal serving as a reference and clock signals which are ±10° ahead of and behind the 0° clock signal in phase. In this embodiment, a clock signal serving as the reference is the $(0+\alpha)°$ clock signal output from the first delay circuit 22. Since the clock signal is used as the reference, the −90° clock signal input to a phase detector 11 needs to be delayed by the same amount. To this end, the third delay circuit 24 is provided.

As described above, in the third embodiment, three clock signals for data sampling are generated using the first to third delay circuits 22 to 24. Accordingly, the internal configuration of the phase interpolator 14 can be simplified.

Fourth Embodiment

A fourth embodiment is a combination of the second and third embodiments.

Figure 5:
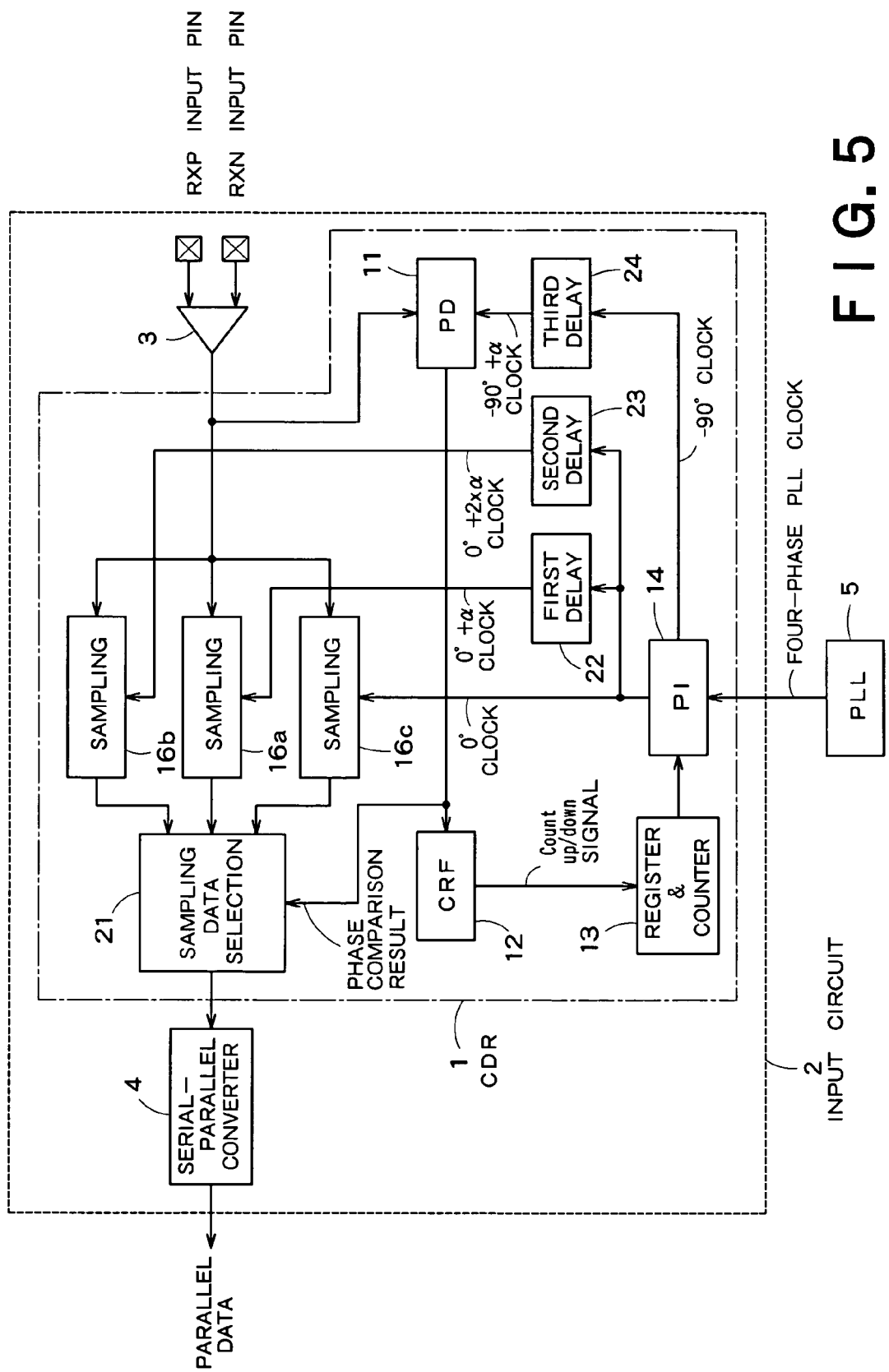
FIG. 5 is a block diagram showing the schematic configuration of a data sampling circuit 16 according to a fourth embodiment of the present invention.

FIG. 5 is a block diagram showing schematic configuration of a data sampling circuit 16 according to a fourth embodiment of the present invention. In FIG. 5, components common to those of FIGS. 3 and 4 are denoted by the same reference numerals, and an explanation will be given below with a focus on differences.

The data sampling circuit 16 of FIG. 5 includes a phase interpolator 14 which outputs a 0° clock signal and a −90° clock signal, a first delay circuit 22 which generates a $(0+\alpha)°$ clock signal, a second delay circuit 23 which generates a $(0+2\alpha)°$ clock signal, a third delay circuit 24 which generates a $(-90+\alpha)°$ clock signal, and three sampling circuits 16a, 16b, and 16c which sample an embedded clock in sync with the three clock signals.

In the fourth embodiment, the phase interpolator 14 only needs to output two-phase clock signals, and thus, the internal configuration of the phase interpolator 14 can be simplified. Also, since sampling of the embedded clock is performed directly using the three clock signals generated by the phase interpolator 14 and first and second delay circuits 22 and 23, the sampling timing can be made a little ahead, and a failure to take in data becomes more unlikely to occur.

What is claimed is:

1. A data sampling circuit, comprising:
a receiver which receives an embedded clock obtained by multiplexing a clock signal and data;
a phase comparator which outputs a phase difference signal indicating phase comparison result by performing a phase comparison between the embedded clock and a first reference clock signal;
a phase interpolator which adjusts a phase of the first reference clock signal and generates a second reference clock signal having a phase different from the phase of the first reference clock signal by 90°, based on the phase difference signal;
a feedback controller which conforms the phase of the first reference clock signal with the phase of the embedded clock by feedback control using the phase comparator and the phase interpolator;
a sampling controller which performs phase control of the second reference clock signal at higher speed than the feedback control of the first feedback loop based on the phase difference signal; and
a sampling circuit which samples the embedded clock received by the receiver in synchronization with the second reference clock signal after performing phase control of the sampling controller.

2. The data sampling circuit according to claim 1,
wherein the phase interpolator generates a third reference clock signal having a phase ahead of the phase of the second reference clock signal by a predetermined amount and a fourth reference clock signal having a phase behind the phase of the second reference clock signal by a predetermined amount;
the sampling controller has a clock selector which selects one of the second to fourth reference clock signals based on the phase difference signal; and
the sampling circuit samples the embedded clock in synchronization with the clock signal selected by the clock selector.

3. The data sampling circuit according to claim 1,
wherein the sampling circuit has a plurality of sampling parts, each sampling the embedded clock received by the receiver in synchronization with a plurality of reference signals obtained by interpolating a phase of the second reference clock signal by phase amount different from each other; and
the sampling controller has a data selector which selects one of data sampled by the plurality of sampling parts based on the phase difference signal.

4. The data sampling circuit according to claim 3,
wherein the phase interpolator generates a third reference clock signal having a phase ahead of the phase of the second reference clock signal by a predetermined amount and a fourth reference clock signal having a phase behind the phase of the second reference clock signal by a predetermined amount;
the plurality of sampling parts includes:
a first sampling part which samples the embedded clock in synchronization with the second reference clock signal;
a second sampling part which samples the embedded clock in synchronization with the third reference clock signal; and
a third sampling part which samples the embedded clock in synchronization with the fourth reference clock signal,
the data selector selecting one of data sampled by the first to third sampling parts.

5. The data sampling circuit according to claim 1, further comprising:
a first delay circuit which delays the second reference clock signal by a first phase amount to generate a third reference clock signal;
a second delay circuit which delays the second reference clock signal by a second phase amount to generate a fourth reference clock signal; and
a third delay circuit which delays the first reference signal generated by the phase interpolator by the first phase amount,
wherein the sampling controller has a clock selector which selects one of the second to fourth reference clock signals based on the phase difference signal;
the sampling circuit samples the embedded clock in synchronization with the clock signal selected by the clock selector; and
the phase comparator compares the phase of the embedded clock with the phase of a first reference signal delayed by the third delay circuit.

6. The data sampling circuit according to claim 3, further comprising:
a first delay circuit which delays the second reference clock signal by a first phase amount to generate a third reference clock signal; and
a second delay circuit which delays the second reference clock signal by a second phase amount to generate a fourth reference clock signal,
wherein the plurality of sampling parts includes:
a first sampling part which samples the embedded clock in synchronization with the second reference clock signal;
a second sampling part which samples the embedded clock in synchronization with the third reference clock signal; and
a third sampling part which samples the embedded clock in synchronization with the fourth reference clock signal,
the data selector selecting one of data sampled by the first to third sampling parts.

7. The data sampling circuit according to claim 1,
wherein the phase interpolator combines four kinds of reference signals having phases different from each other by 90° to generate the first reference clock signal having an arbitrary phase and the second reference clock signal having a phase different from the phase of the first reference clock signal by 90°.

8. The data sampling circuit according to claim 2,
wherein the predetermined amount is less than 90°.

9. The data sampling circuit according to claim 2,
wherein the phase difference between the second and third reference clock signals is less than 90°, and the phase difference between the third and fourth reference clock signals is less than 90°.

10. A semiconductor integrated circuit, comprising:
a PLL circuit which generates four kinds of reference signals having phases different from each other;
a data sampling circuit which samples an embedded clock obtained by multiplexing a clock signal and data by using the four kinds of reference signals; and
a serial-parallel converter which converts the embedded clock sampled by the data sampling circuit into parallel data,
wherein the data sampling circuit includes:
a receiver which receives the embedded clock;

a phase comparator which outputs a phase difference signal by performing a phase comparison between the embedded clock and a first reference clock signal generated based on the four kinds of reference signals;

a phase interpolator which adjusts a phase of the first reference clock signal and generates a second reference clock signal having a phase different from the phase of the first reference clock signal by 90°, based on the phase difference signal;

a feedback controller which conforms the phase of the first reference clock signal with the phase of the embedded clock by feedback control using the phase comparator and the phase interpolator;

a sampling controller which performs phase control of the second reference clock signal at higher speed than the feedback control of the first feedback loop based on the phase difference signal; and a sampling circuit which samples the embedded clock received by the receiver in synchronization with the second reference clock signal after performing phase control of the sampling controller.

11. The semiconductor integrated circuit according to claim 10, wherein the phase interpolator generates a third reference clock signal having a phase ahead of the phase of the second reference clock signal by a predetermined amount and a fourth reference clock signal having a phase behind the phase of the second reference clock signal by a predetermined amount;

the sampling controller has a clock selector which selects one of the second to fourth reference clock signals based on the phase difference signal; and the sampling circuit samples the embedded clock in synchronization with the clock signal selected by the clock selector.

12. The semiconductor integrated circuit according to claim 10, wherein the sampling circuit has a plurality of sampling parts, each sampling the embedded clock received by the receiver in synchronization with a plurality of reference signals obtained by interpolating a phase of the second reference clock signal by phase amount different from each other; and the sampling controller has a data selector which selects one of data sampled by the plurality of sampling parts based on the phase difference signal.

13. The semiconductor integrated circuit according to claim 12, wherein the phase interpolator generates a third reference clock signal having a phase ahead of the phase of the second reference clock signal by a predetermined amount and a fourth reference clock signal having a phase behind the phase of the second reference clock signal by a predetermined amount;

the plurality of sampling parts includes:

a first sampling part which samples the embedded clock in synchronization with the second reference clock signal;

a second sampling part which samples the embedded clock in synchronization with the third reference clock signal; and a third sampling part which samples the embedded clock in synchronization with the fourth reference clock signal, the data selector selecting one of data sampled by the first to third sampling parts.

14. The semiconductor integrated circuit according to claim 10, further comprising:

a first delay circuit which delays the second reference clock signal by a first phase amount to generate a third reference clock signal;

a second delay circuit which delays the second reference clock signal by a second phase amount to generate a fourth reference clock signal; and a third delay circuit which delays the first reference signal generated by the phase interpolator by the first phase amount, wherein the sampling controller has a clock selector which selects one of the second to fourth reference clock signals based on the phase difference signal;

the sampling circuit samples the embedded clock in synchronization with the clock signal selected by the clock selector; and the phase comparator compares the phase of the embedded clock with the phase of a first reference signal delayed by the third delay circuit.

15. The semiconductor integrated circuit according to claim 12, further comprising:

a first delay circuit which delays the second reference clock signal by a first phase amount to generate a third reference clock signal; and a second delay circuit which delays the second reference clock signal by a second phase amount to generate a fourth reference clock signal, wherein the plurality of sampling parts includes:

a first sampling part which samples the embedded clock in synchronization with the second reference clock signal;

a second sampling part which samples the embedded clock in synchronization with the third reference clock signal; and a third sampling part which samples the embedded clock in synchronization with the fourth reference clock signal, the data selector selecting one of data sampled by the first to third sampling parts.

16. The semiconductor integrated circuit according to claim 10, wherein the phase interpolator combines four kinds of reference signals having phases different from each other by 90° to generate the first reference clock signal having an arbitrary phase and the second reference clock signal having a phase different from the phase of the first reference clock signal by 90°.

17. The semiconductor integrated circuit according to claim 11, wherein the predetermined amount is less than 90°.

18. The semiconductor integrated circuit according to claim 11, wherein the phase difference between the second and third reference clock signals is less than 90°, and the phase difference between the third and fourth reference clock signals is less than 90°.

19. The semiconductor integrated circuit according to claim 10, wherein the data sampling circuit is provided for each data channel; and the PLL circuit is shared by a plurality of data sampling circuits corresponding to a plurality of data channels.

20. The semiconductor integrated circuit according to claim 10, further comprising:

an output circuit which outputs the embedded clock obtained by multiplexing serial data and a clock signal.

* * * * *